United States Patent [19]

Yajima et al.

[11] Patent Number: 5,367,395
[45] Date of Patent: Nov. 22, 1994

[54] APPARATUS FOR DETECTION AND LOCATION OF FAULTS IN TWO-WAY COMMUNICATION THROUGH SINGLE OPTICAL PATH

[75] Inventors: Noboru Yajima; Hiroshi Yoshida; Yasuko Komuro, all of Kawasaki, Japan

[73] Assignee: Fujitsu Limited, Kawasaki, Japan

[21] Appl. No.: 10,281

[22] Filed: Jan. 28, 1993

[30] Foreign Application Priority Data

Jan. 30, 1992 [JP] Japan .................................. 4-015496

[51] Int. Cl.$^5$ ............................................ H04B 10/08
[52] U.S. Cl. .................................. 359/110; 359/113;
359/128; 359/152; 359/166; 371/20.5; 370/15
[58] Field of Search ............... 359/110, 113, 128, 143,
359/152, 166, 177, 179; 370/15; 371/20.5

[56] References Cited

U.S. PATENT DOCUMENTS

| | | | |
|---|---|---|---|
| 4,883,668 | 5/1989 | Rowley et al. | 359/110 |
| 4,887,309 | 12/1989 | Andersson et al. | 359/110 |
| 5,010,544 | 4/1991 | Chang et al. | 370/13.1 |
| 5,043,976 | 8/1991 | Abiven et al. | 389/110 |

FOREIGN PATENT DOCUMENTS

| | | | |
|---|---|---|---|
| 0499529 | 8/1992 | European Pat. Off. | |
| 0063949 | 4/1982 | Japan | 371/20.5 |
| 0010344 | 1/1986 | Japan | 359/166 |
| 0113736 | 4/1990 | Japan | 359/110 |
| 0092025 | 4/1991 | Japan | 359/110 |

*Primary Examiner*—Richard E. Chilcot, Jr.
*Assistant Examiner*—Kinfe-Michael Negash

[57] ABSTRACT

In a first apparatus, transmission signals are inverted in a sending side and are restored in a receiving side in one direction of two-way communication, and transmission signals are not inverted in another direction, to thereby distinguish a signal reflected at a fault point of an optical fiber from normal receiving signals from the station of the other party. In a loopback test, an inverter provided in the receiving side of the former direction is bypassed and an inverter is inserted in the receiving side of the latter direction. In a second apparatus, overhead information for identifying stations is added in a sending side. In a receiving side, the overhead is extracted. The extracted overhead is compared with an identifier of the station of the other party in a normal operation and is compared with an identifier of the station itself in a loopback test.

4 Claims, 3 Drawing Sheets

APPARATUS FOR DETECTION AND LOCATION OF FAULTS IN TWO-WAY COMMUNICATION THROUGH SINGLE OPTICAL PATH

BACKGROUND OF THE INVENTION

1. Field of the Invention

The present invention relates to an apparatus for detecting and locating faults in a two-way communication system using a single optical path according to SDH (Synchronous Digital Hierarchy) or PDH (Plesiochronous Digital Hierarchy) or others.

2. Field of the Invention

As society has grown to become more information-oriented, it has been increasingly required that communication lines have high reliability. For this reason, communication systems are desired to be essentially free from faults, but once a fault occurs it is necessary to detect the occurrence of the fault and to specify the location of the fault as soon as possible to remove the cause of the fault and restore the system.

In a two-way communication system using a single optical fiber, if a fault occurs in the optical fiber, an optical signal sent from a station is reflected at the fault position of the optical fiber and returns to the station that is waiting for an optical signal sent from a station of another party. If the station cannot distinguish the reflected signals from the signal sent from the other party, occurrence of the fault cannot be immediately detected.

In order to immediately detect the occurrence of a fault in a two-way communication system using a single optical fiber, conventionally, signals in one direction of the two-way communication are inverted in a sending side and received signals in that direction are inverted also in a receiving side. Signals are not inverted in the other direction of the two-way communication. In this construction, if a transmission signal is reflected at a fault point, a station waiting for inverted signals receives non-inverted signals and a station waiting for non-inverted signals receives inverted signals and therefore the frame synchronization is lost. Occurrence of the fault can be immediately detected by detecting the loss of frame synchronization.

In this construction, however, a loopback test for locating a fault cannot be executed, because frame synchronization is not established even when normal signals have returned back to receiving side.

SUMMARY OF THE INVENTION

It is an object of the present invention to provide an apparatus for detecting and locating faults occurring in a two-way communication system using a single optical path.

In accordance with the present invention, there is provided an apparatus for detecting and locating a fault having occurred in a two-way communication between stations using a single optical path in a normal operation, comprising means for sending from a station an optical signal discriminated from another optical signal sent from another station, means for switching the normal operation to a loopback test operation wherein the optical signal is returned back to the station that sent the optical signal, and means, operating together with the switching means, for accepting only the optical signal sent from the station of the other party in the normal operation, and for accepting only the optical signal sent from the station itself in the loopback test operation.

DESCRIPTION OF THE PREFERRED EMBODIMENTS

Figure 1:
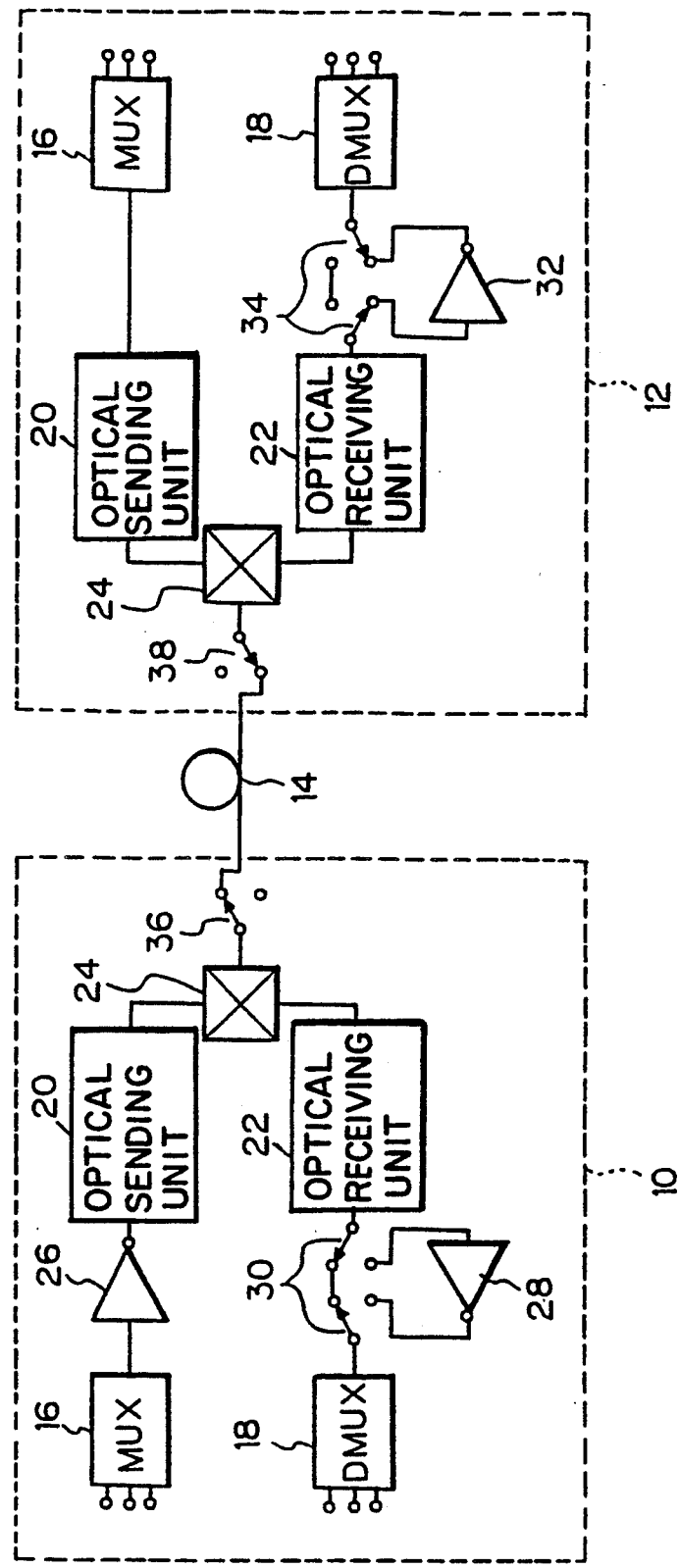
FIG. 1 is a block diagram showing a construction of a two-way communication system according to an embodiment of the present invention.

FIG. 1 is a block diagram showing a construction of a two-way communication system according to an embodiment of the present invention.

In FIG. 1, stations 10 and 12 connected to each other through a single optical fiber 14 are shown. Either of the stations 10 and 12 includes a multiplexer 16 for multiplexing a plurality of digital signals into a high speed digital signal, a demultiplexer 18 for performing a reverse operation of the multiplexer 16, i.e., for demultiplexing the high speed digital signal into individual digital signals, an optical sending unit 20 for converting an electrical signal into an optical signal to be transmitted through the optical fiber 14, an optical receiving unit 22 for converting the optical signal into the electrical signal, and an optical coupler 24 for injecting the optical signal to be transmitted into the optical fiber 14 and for separating the received optical signal from the optical fiber 14.

In the station 10, a logic inverter 26 is provided between the multiplexer 16 and the optical sending unit 20 and a logic inverter 28 is provided between the optical receiving unit 22 and the demultiplexer 18. A switch 30 is provided to bypass the logic inverter 28. In the station 12, a logic inverter 32 is provided between the optical receiving unit 22 and the demultiplexer 18 and a switch 34 is provided to bypass the logic inverter 32. Optical switches 36 and 38 are provided for executing a loopback test in the stations 10 and 12, respectively.

In a normal operation, switches 30, 34, 36 and 38 are set as shown in FIG. 1. In this situation, the signal transmitted from the station 10 to the station 12 is inverted in the inverter 26 and is restored in the inverter 32, and the signal transmitted from the station 12 to the station 10 is not inverted. In a loopback test, the optical switches 36 and 38 are opened. The switch 30 operating together with the optical switch 36 is switched so that the inverter 28 is inserted between the optical receiving unit 22 and the demultiplexer 18. The switch 34 operating together with the optical switch 38 is switched so that the inverter 32 is bypassed. Thus, the loopback test that cannot be executed in the conventional system is realized in both the stations 10 and 12.

Figure 2:
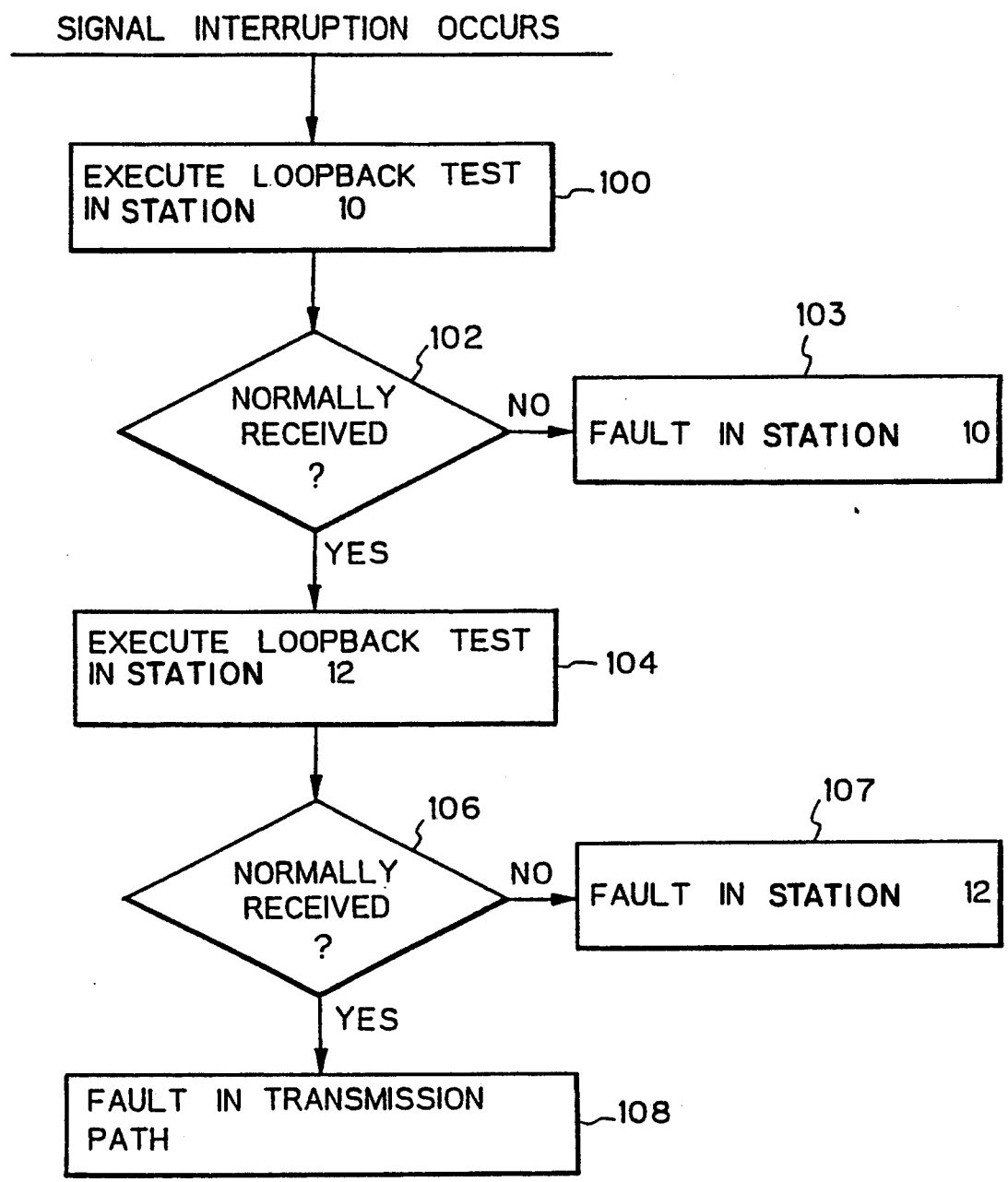
FIG. 2 is a flow chart showing a fault location procedure in the system of FIG. 1.

FIG. 2 is a flowchart showing a procedure of fault location in the embodiment of FIG. 1. The loopback test is executed separately in the stations 10 and 12 by remote-control through a control line from a network management device (not shown). When signal interruption occurs in the normal connection shown in FIG. 1, the Loopback test is executed in the station 10, in step 100, by opening the switch 36 and inserting the inverter 28. In step 102, if the optical signal output from the station itself is not normally received, it is decided that the station 10 is experiencing a fault. If the signal is normally received, the loopback test is executed in the station 12 in step 104. In step 106, if the signal output from the station itself is not normally received, it is decided that the station 12 is experiencing a fault. If the signal is normally received, it is decided that the optical path 14 is experiencing a fault.

Figure 3:
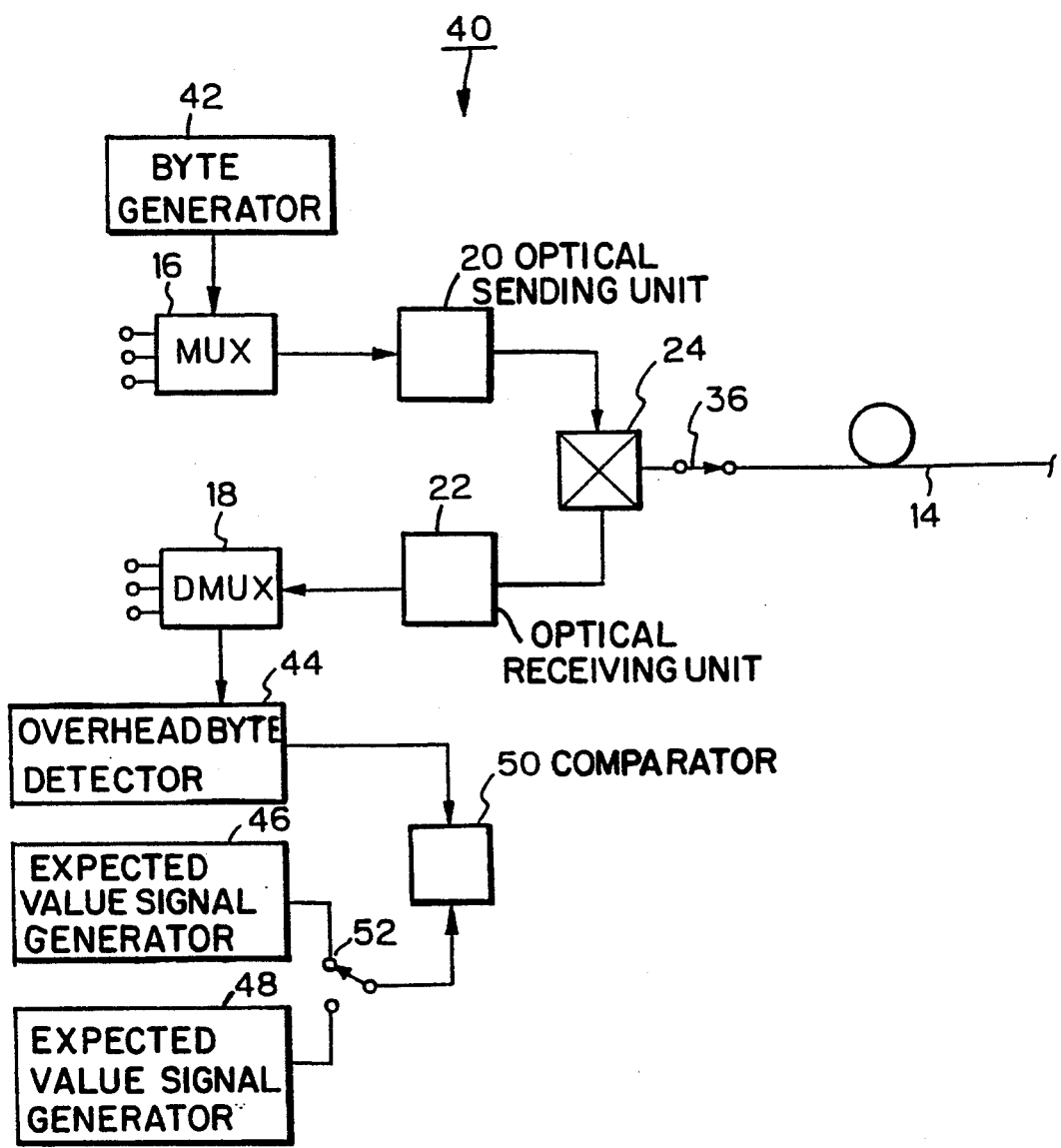
FIG. 3 is a block diagram showing a construction of one of the stations in a two-way communication system according to another embodiment of the present invention.

FIG. 3 is a block diagram showing another embodiment of the present invention. In FIG. 3, only a station 40 is shown. A station of another party has the same construction. The same reference numerals as used in FIG. 1 are used in FIG. 3 for constituents that are similar to those in FIG. 1, and thus descriptions thereof are left out. The station 40 further includes an overhead byte generating circuit 42 for generating overhead information including information for identifying stations, an overhead byte detecting circuit 44 for extracting overhead information from received signals, an expected value generation circuit 46 for generating a signal identical to information for identifying the station of the other party, an expected value generation circuit 48 for generating a signal identical to information for identifying the station itself, a comparator 50 for comparing received information for identifying stations with an output of the expected value generation circuit 46 or 48, and a switch 52 operating together with the optical switch 36.

In normal operation, the optical switch is closed and the switch 52 is set so as to select the output of the expected value generation circuit 46. In this situation, signals sent from the station of the other party are fed to the demultiplexer 18 and station identifying information is extracted therefrom. In the comparator 50, the extracted information is compared with the output of the expected value generation circuit 46 that outputs a signal identical to the station identifying information of the other party. Therefore, if the signal sent from the station of the other party is abnormal, the comparator 50 outputs an alarm indicating a discrepancy.

In the loopback test, the optical switch 36 is opened. The optical signal output from the optical sending unit 20 is reflected in the optical switch 36 and is fed to the demultiplexer 18. The switch 52 operating together with the optical switch 36 selects the output of the expected value generating circuit 48 that outputs the signal identical to the station identifying information of the station itself. If a discrepancy is detected in the comparator 50, the comparator 50 outputs an alarm. According to the fault location procedure as described with reference to FIG. 2, the fault location is easily realized in the system of FIG. 3.

We claim:

1. An apparatus for detecting and locating a fault having occurred in a two-way communication system between a first station and a second station, said system using a single optical path in normal operation, comprising:
   means for transmitting from said first station a first optical signal distinguishable from a second optical signal transmitted from said second station, said transmitting means including;
   means for generating said first optical signal in said first station, and
   means for generating said second optical signal in said second station;
   switching means for switching from the normal operation to a loopback test operation wherein the first optical signal is returned back to said first station that sent said first optical signal; and
   first receiving means in said first station, operating together with the switching means, for receiving only the second optical signal via said optical path in normal operation, and for reception of only the first optical signal in the loopback test operation.

2. An apparatus as claimed in claim 1, wherein in each said station, said means for generating an optical signal includes a respective first and second optical sending unit for converting an electrical signal into the optical signal to be transmitted, and wherein
   the first receiving means includes a first optical receiving unit for converting the optical signal received into an electrical signal.

3. An apparatus for detecting and locating a fault having occurred in a two-way communication system between a first station and a second station, said system using a single optical path in normal operation, comprising:
   means for transmitting from said first station a first optical signal distinguishable from a second optical signal transmitted from said second station, said transmitting means including;
   means for generating said first optical signal in said first station, and
   means for generating said second optical signal in said second station;
   said transmitting means in the first station further including a first logic inverter for inverting logic levels of a first electrical signal to be input to said first optical sending unit of said first station to thereby distinguish the first optical signal from the second optical signal;
   switching means for switching from the normal operation to a loopback test operation wherein the first optical signal is returned back to said first station that sent said first optical signal; and
   first receiving means in said first station, operating together with the switching means, for receiving only the second optical signal via said optical path in normal operation, and for reception of only the first optical signal in the loopback test operation, the first receiving means in the first station including a second logic inverter, and a first switch for connecting the second logic inverter to the first optical receiving unit in the loopback test operation to thereby receive only the first optical signal in the loopback test operation, and for bypassing the second logic inverter in normal operation to thereby receive only the second optical signal in normal operation, and
   second receiving means in the second station including a third logic inverter, and a second switch for connecting the third logic inverter to a second optical receiving unit in normal operation to thereby receive only the first optical signal sent in normal operation, and for bypassing the third logic inverter in the loopback test operation to thereby accept only the second optical signal in the loopback test operation.

4. An apparatus for detecting and locating a fault having occurred in a two-way communication system between a first station and a second station, said system using a single optical path in normal operation, comprising:
   means for transmitting from said first station a first optical signal distinguishable from a second optical signal transmitted from said second station, said transmitting means including;

means for generating said first optical signal in said first station, and means for generating said second optical signal in said second station;

switching means for switching from the normal operation to a loopback test operation wherein the first optical signal is returned back to said first station that sent said first optical signal; and first receiving means in said first station, operating together with the switching means, for receiving only the second optical signal via said optical path in normal operation, and for reception of only the first optical signal in the loopback test operation, said transmitting means further including:

means for adding information for distinguishing the first optical signal from said second optical signal, said information being added to the electrical signal to be input to the respective optical sending unit, means for extracting the distinguishing information from the electrical signal output from the optical receiving unit, means for providing information data, means for selecting data from said means for providing, said selected data being identical to the distinguishing information included in the second optical signal in normal operation, and said selected data being identical to the distinguishing information included in the first optical signal in the loopback test operation, and means for comparing the distinguishing information extracted by the extracting means with the data selected by the selecting means to thereby detect a fault.

* * * * *